United States Patent [19]
Magallanes et al.

[11] Patent Number: 5,925,103
[45] Date of Patent: Jul. 20, 1999

[54] INTERNET ACCESS DEVICE

[76] Inventors: Edward Patrick Magallanes, 2542 Babcock Rd. F 203, San Antonio, Tex. 78229; Roberto Salinas-Price, 701 North St. Mary's, San Antonio, Tex. 78208; Harry W. Mazal, 16430 Hidden View, San Antonio, Tex. 78232

[21] Appl. No.: 08/592,811

[22] Filed: Jan. 26, 1996

[51] Int. Cl.[6] .............................. G06F 13/38; G06F 15/17
[52] U.S. Cl. ........................... 709/230; 709/218; 345/327
[58] Field of Search ...................... 395/200.47, 200.48, 395/200.49, 200.58, 200.6, 200.66; 463/29, 40, 41, 42; 348/12, 13; 455/5.1; 370/487, 469; 379/90.1, 93.3; 345/327

[56] References Cited

U.S. PATENT DOCUMENTS

| | | | |
|---|---|---|---|
| D. 357,685 | 4/1995 | Reardon et al. | 242/107 |
| 3,621,217 | 11/1971 | Carr et al. | 235/150 |
| 3,760,167 | 9/1973 | Schrimshaw | 151/42 |
| 3,879,605 | 4/1975 | Carl et al. | 235/156 |
| 4,115,867 | 9/1978 | Vladimirov et al. | 364/900 |
| 4,291,198 | 9/1981 | Anderson et al. | 179/340 |
| 5,008,927 | 4/1991 | Weiss et al. | 379/98 |
| 5,025,373 | 6/1991 | Keyser et al. | 364/408 |
| 5,129,078 | 7/1992 | Groves et al. | 395/550 |
| 5,181,107 | 1/1993 | Rhoades | 395/200.48 |
| 5,220,501 | 6/1993 | Lawlor et al. | 364/408 |
| 5,347,304 | 9/1994 | Moura et al. | 348/12 |
| 5,428,731 | 6/1995 | Powers, III | 395/154 |
| 5,440,335 | 8/1995 | Beveridge | 348/13 |
| 5,440,336 | 8/1995 | Buhro et al. | 348/13 |
| 5,440,632 | 8/1995 | Bacon et al. | 380/20 |
| 5,442,389 | 8/1995 | Blahut et al. | 348/7 |
| 5,442,749 | 8/1995 | Northcutt et al. | 395/200.09 |
| 5,446,490 | 8/1995 | Blahut et al. | 348/7 |
| 5,539,449 | 7/1996 | Blahut et al. | 379/90.1 |
| 5,544,320 | 8/1996 | Konrad | 395/200.49 |
| 5,550,578 | 8/1996 | Hoarty et al. | 348/12 |
| 5,586,257 | 12/1996 | Perlman | 395/200.58 |

OTHER PUBLICATIONS

Heylighen, F.; "World–Wide Web: a distributed hypermedia paradigm for global netwroking"; Proceeding: SHARE Europe Spring Conference; pp. 355–368, Apr. 18, 1994.

*Primary Examiner*—Mark H. Rinehart
*Attorney, Agent, or Firm*—Jenkens & Gilchrist

[57] ABSTRACT

An improved Internet access system using a client server arrangement is provided with the basic input from a user coming from a small television top unit containing a limited amount of electronics. This network access device connects to Internet access servers which operate to connect a plurality of network access devices to the Internet. The Internet access server formats and decodes requests for services from the individual network access devices and images and messages from the Internet to the individual network access devices using a server model.

18 Claims, 9 Drawing Sheets

Network Access Box Rear View

Network Access Box Front View

INTERNET ACCESS DEVICE

BACKGROUND OF THE INVENTION

1. Technical Field of the Invention

The present invention is directed to an improved and simplified arrangement for Internet access and more particularly, is directed to an improved Internet access device which brings Internet access to non-computer users at a lower cost.

2. Description of Related Art

Prior art arrangements for accessing the Internet have generally been either a conventional terminal such as VT100 type terminal, or more recently, a personal computer using a SLIP/PPP type of connection. However, problems have existed with both of these types of mechanisms for accessing the Internet. Terminals such as the VT100 are text based and do not provide the graphical environment that users have come to expect in light of the popularity of the Windows® and MacIntosh® environment, or the like. Further, World Wide Web access has been limited with respect to text based terminals and has been basically useable only for text based Internet access and is therefore limited generally to e-mail or the like. Furthermore, the syntax and command structure that is generally used on these types of terminals as well as the fact that they must still be connected to an Internet service provider of some type, have limited the availability and usability of these systems for a non-computer user.

The recent personal computer revolution has provided a mechanism by which users can use a graphical interface to connect to either the World Wide Web or the Internet. However, the cost of a personal computer and the accompanying devices are prohibitive.

One of the factors slowing the wider deployment of the Internet is that it requires an expertise level which is quite high. Today's computer are difficult to use and require significant levels of expertise, generally built over many years of computer use. Also, non-computer users are quite often intimidated by the technology of computers. This invention is directed towards non-computer users, with an ease of use as one of the primary goals. Using a conventional television for the display (which is percieved and used by many people) reduces the intimidation factor many individuals would have. As even non-computer users are familiar with television from their use with VCRs, Nintendo® or the like the intimidation factor is reduced.

Furthermore, security concerns have prevented a wide acceptance of the Internet and in particular, the use of the Internet for on-line ordering of products has been limited.

SUMMARY OF THE INVENTION

The present invention overcomes the shortcomings of text based terminals and the high costs associated with personal computer based solution by using an easy to use network access device which would connect to a standard television for displaying the information and which uses a standard telephone jack for the network access. The control over this network access device is by a remote controller and a network infrastructure is provided in which the bulk of the computational power that is needed is provided at a "host end" in which the control and point of connection to the Internet is not at the personal computer level, but rather at the host level only. As can be seen from FIG. 1, the structure of the components of this invention are shown in generalized block arrangements. The Internet access server of this invention is dedicated to providing the point of contact to the Internet separate from the network access device, and further, the network access device is limited to dialing only predefined telephone numbers which are not alterable by the user. This provides a measure of security wherein the network access device may only be used by an individual who has paid their subscription fee to the access provider. Further, security of the connection can be controlled in a far greater manner. Further, an individual measure of security is provided in that if a given network access box is stolen the use of a given box can be prevented and tracked if the network access device attemps to contact or connect to any Internet access server. The Internet access server itself is the point of contact to the Internet and in particularly, the World Wide Web or e-mail, and all information passes through the Internet access server and then this information is transferred to the network access device. This network access device provides only the electronics and software for the display of the information on the television. The remote controller being a small hand held device much like a television remote control and which provides a far more simplified input device. Commands can be entered through this remote controller and allow the network access device to relay commands to the Internet access server so then this access server can issue the appropriate connections, retrievals or the like within the Internet. This network access remote controller may be hard wired or may be an infrared type of connection to the network access device. Furthermore, a keyboard can be provided to the network access device, however, this is not necessary.

Furthermore, the connection between the network access device and the Internet access server is by a protocol which is explicitly and purposely different from the standard TCP/IP access protocol used on the Internet. This new protocol provides a flexibility to control the display of images and text on the television screen in a very easy fashion. This provides an advantage in the simplified logic necessary in the network access device that is part of this invention and provides improvements over prior art systems.

BRIEF DESCRIPTION OF THE DRAWINGS

Other advantages and novel features of the present invention can be understood and appreciated from the following detailed description of the invention, taken in conjunction with the accompanying drawings wherein.

DETAILED DESCRIPTION OF THE PRESENTLY PREFERRED

Exemplary Embodiments

One of the unique features and advantages of this invention is the reduction in cost and the fact that the network access device may be made rather inexpensive and may be connected and operated by a non-computer user easier than prior art systems. Specifically, as the network access device requires only the ability simply to display the image on a screen in a simplified form and uses conventional television screens as the display medium, many of the electronic circuitry that is found in a generalized personal computer are not present or necessary in the network access device of this invention. This reduces the costs of building and maintaining the device significantly over the personal computer type solution previously discussed. Further, by still having a graphical environment provided to the user, novice users may still traverse and use the Internet in the manner which has now been expected. This can be accomplished in a far more expeditious manner than has been previously available. As the World Wide Web is becoming more and more in use, the hypertext type of links which are present in World Wide Web documents need to be selected using a graphical environment.

Figures 2A, 2B:
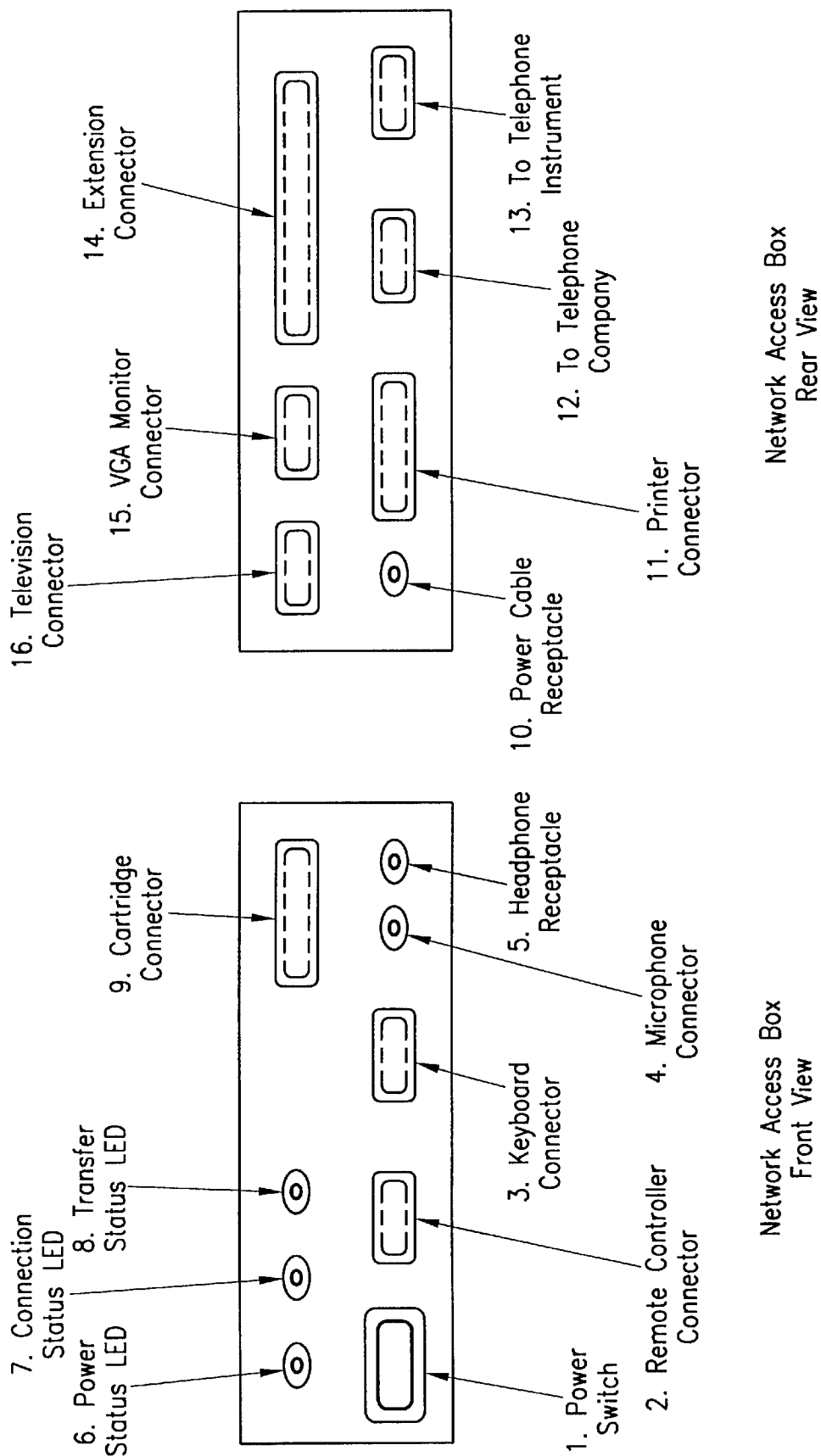
FIG. 2A and FIG. 2B show the front and rear view of the network access device, according to one embodiment of this invention.

As can be seen from FIG. 2A, the network access device has as external controls, a limited number of options. The power switch 1 simply provides power to the device. The connector to the remote controller allows for the connection of a wired remote controller and a television connector is used to connect the device to a television. Additional diagnostic lights, such as the three Light-Emitting Diodes (LEDs) shown in FIG. 2A, can be used such as the power status LED 4, a connection status LED 5 and a transfer status LED 6. The power status light LED 4 is believed to be self-explanatory and the connection status LED 5 indicates that the telephone connection between the network access device and the Internet access server is accomplished. This LED may be, for example, red when no connection is present, yellow when a connection is in progress and green when the connection has been established. A transfer status LED may be provided to inform the user that information updating is occurring.

FIG. 2B showing the rear of the device, provides connections for standard telephone cables both to the Internet access server and an additional connection so that a standard telephone may be attached to the device so as to increase functionality. The extension connector has been provided for future expansion, which however is not part of this invention and is not currently claimed.

Figure 3:
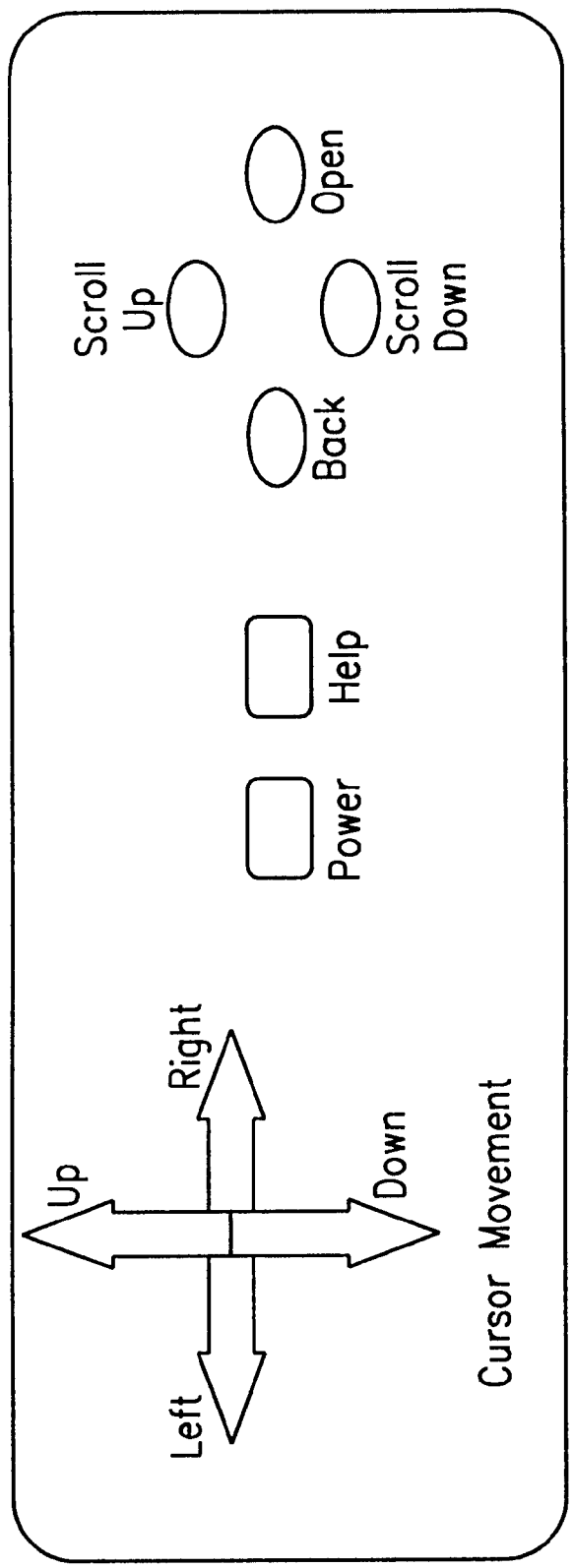
FIG. 3 shows a block diagram of the remote controller of this invention.

As shown in FIG. 3, it is contemplated that the remote controller be simplified and have only a limited number of selections so as to provide ease of use. For example, the up, down, left and right keys may be used to replace the functions that would normally require a mouse or other type of complicated pointing device in a personal computer environment. The open and back keys are used equivalently to a selection arrangement on a conventional PC mouse with the close button providing the functionality of disabling or shutting down a specific link when following web pages, for example.

Figure 1:
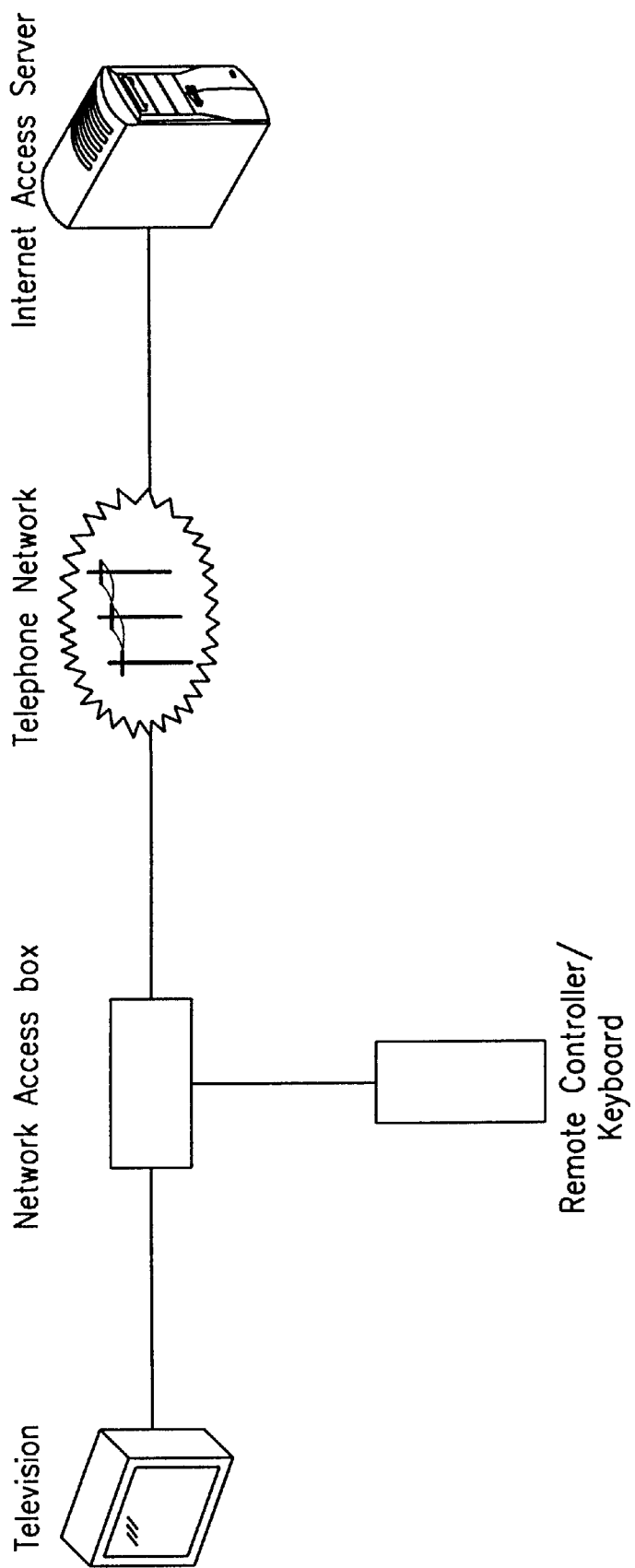
FIG. 1 is a block diagram showing the arrangement of this invention.
Figure 4:
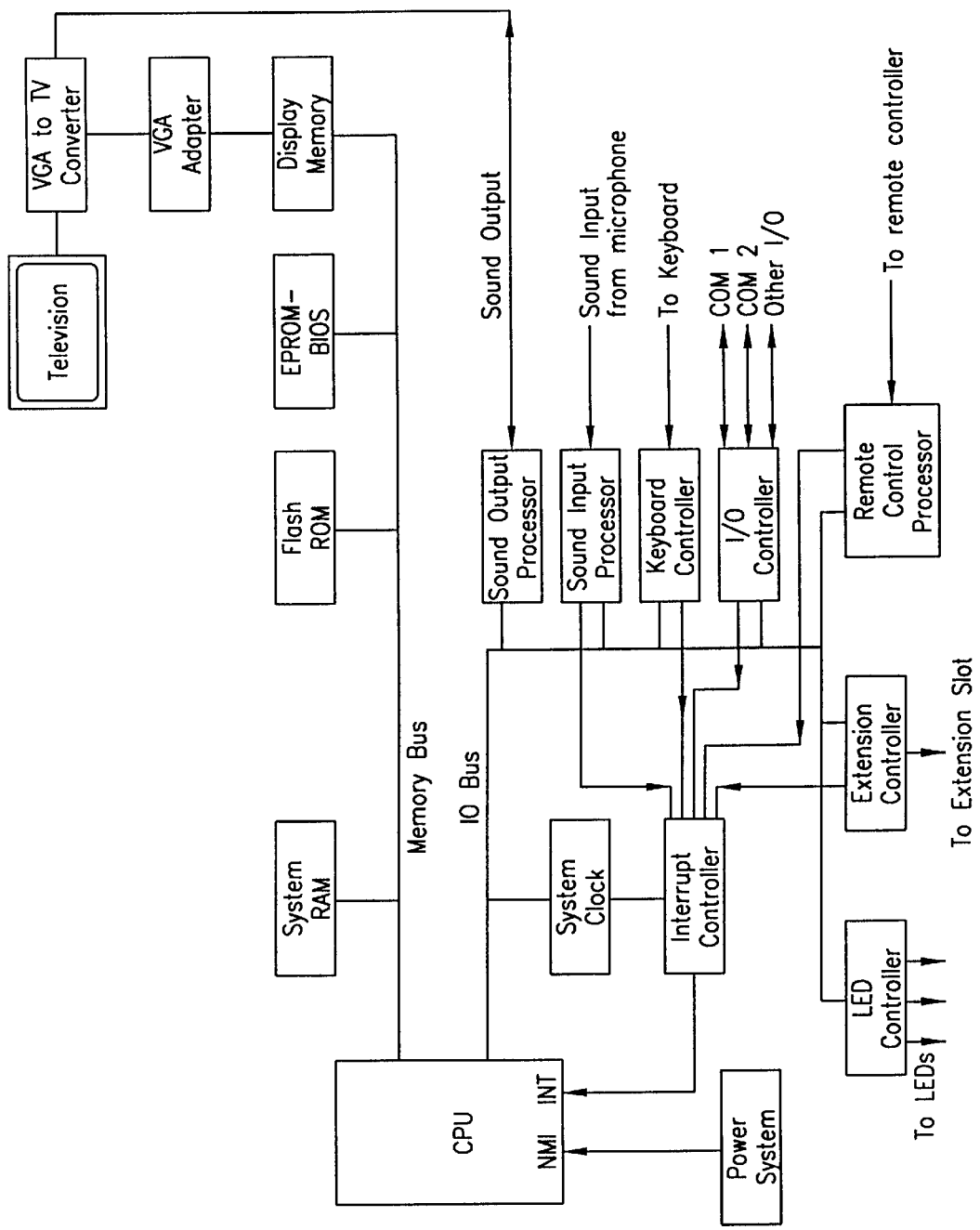
FIG. 4 shows a hardware block diagram of the network access device.

As can be seen from FIG. 4, the required elements contained within the network access device are significantly less than would be present in the conventional computer base solution to this problem. The device may, for example employ as the CPU, something as simple as an 8086 micro processor. The memory bus and the I/O bus of FIG. 4 carry the signals from the CPU to each of the corresponding devices. The memory in the network access device has several multi-purpose memory segments contained therein. It would be readily understood by one of ordinary skill in the art, that the system RAM provides the primary memory for the CPU to store programs and data with the display memory holding information to be displayed. The video adaptor reads display memory and converts the contents to display data. This may be implemented using several conventional types of memory display chips which are readily available and are inexpensive to implement. The VGA-to-TV converter will convert into standard TV format such as the NTSC standard in North America. However, it should be readily understood that PAL or SECAM type standards could be used in other countries. The I/O bus handles data coming from the input and output devices which would include a sound processor which will supplement and provide sound to the television as well as sound coming from an input device such as a microphone. A keyboard controller will process input either from a keyboard, if it is provided, or from the remote control, or from both. The I/O controller module processes inputs and outputs from the serial ports in the system and provides a connection between the network access device and this Internet access service device shown in FIG. 1. The remote control processor will also process commands received from the remote controller. The LEDs are obviously controlled by the LED controller and further expansion is provided by having an expansion controller.

Figure 5:
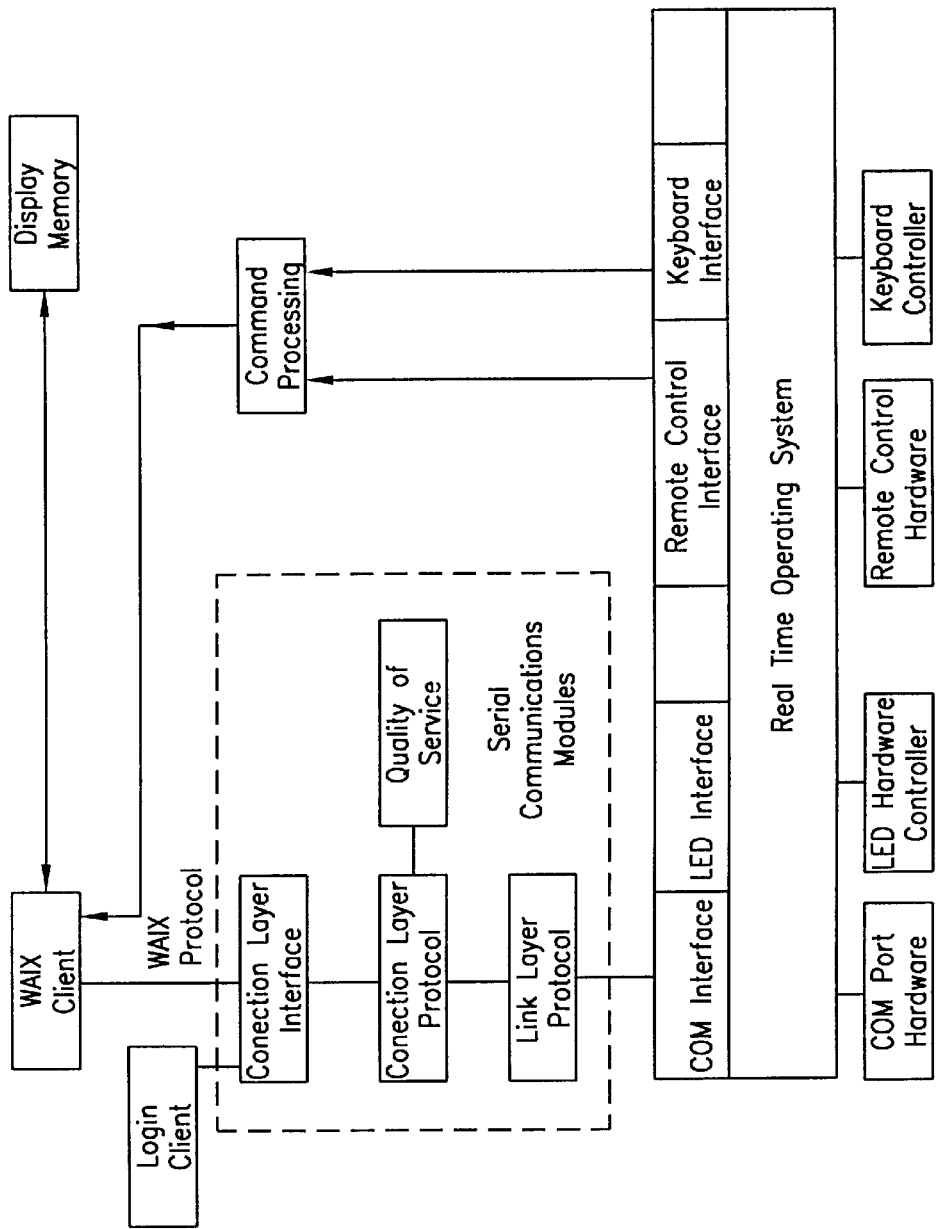
FIG. 5 shows the software modules used in the network access device.
Figure 6:
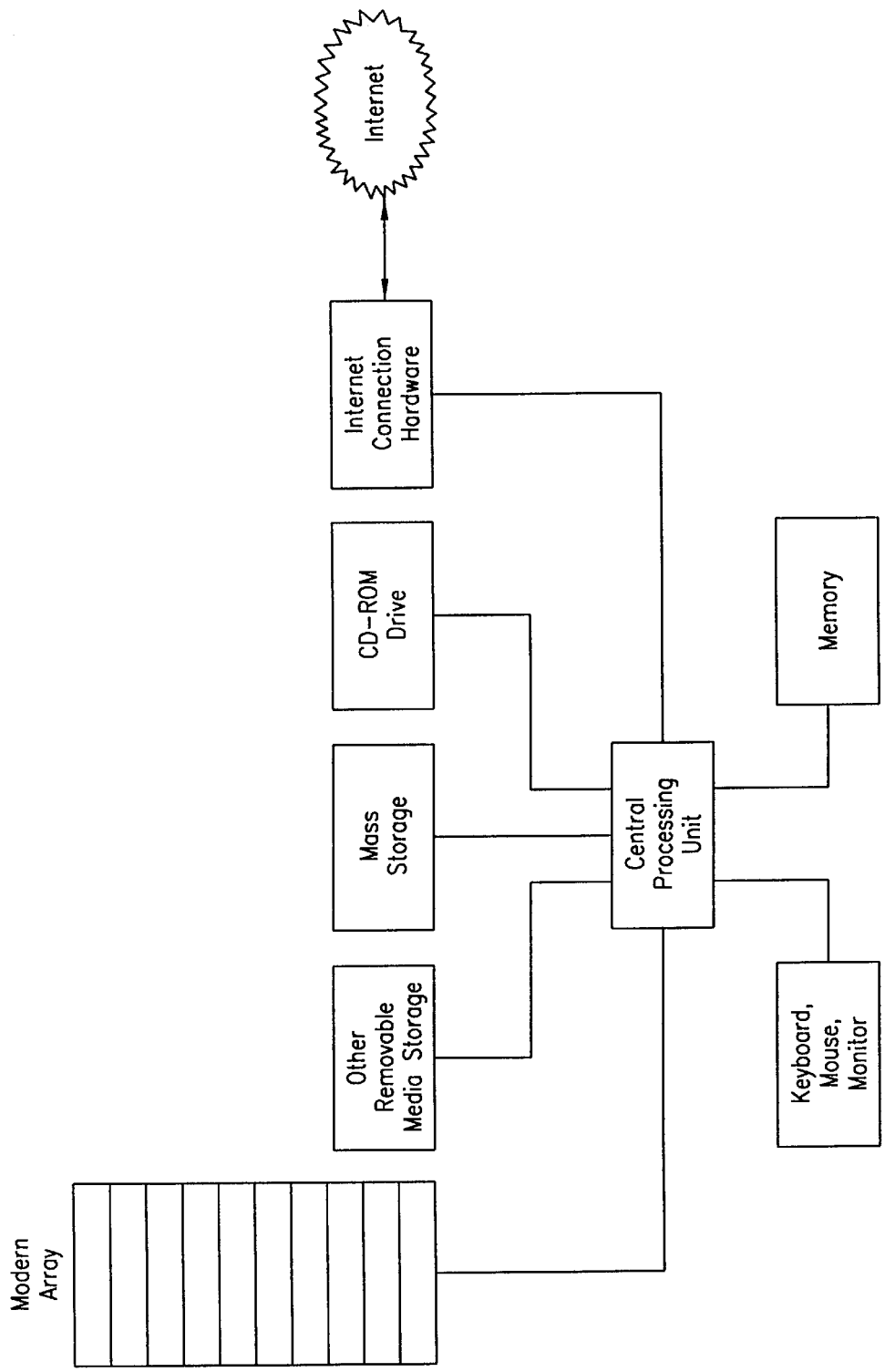
FIG. 6 shows a block diagram of the Internet access server as contemplated in this invention.
Figure 7:
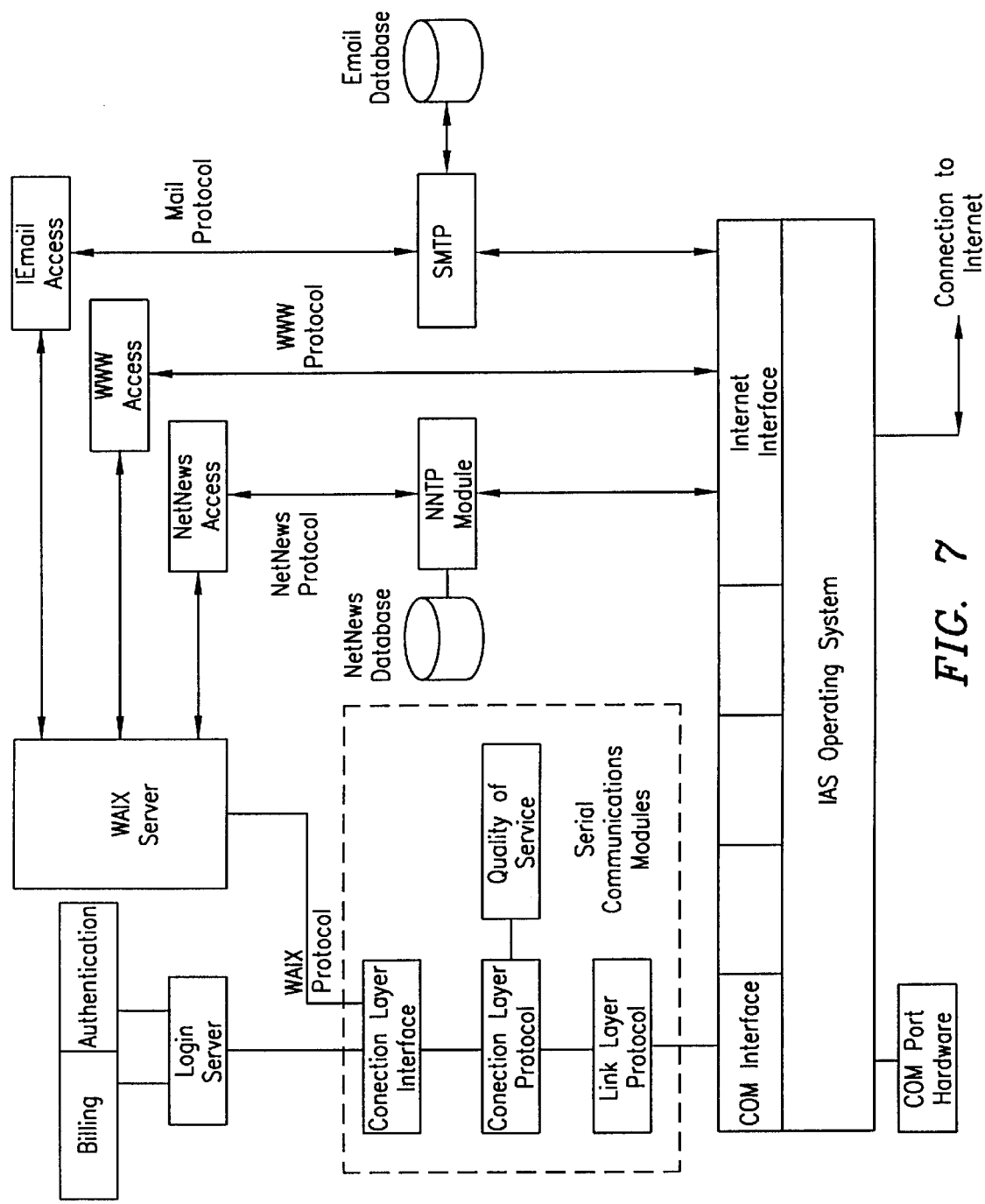
FIG. 7 shows the software module arrangement of the Internet access server.
Figure 8:
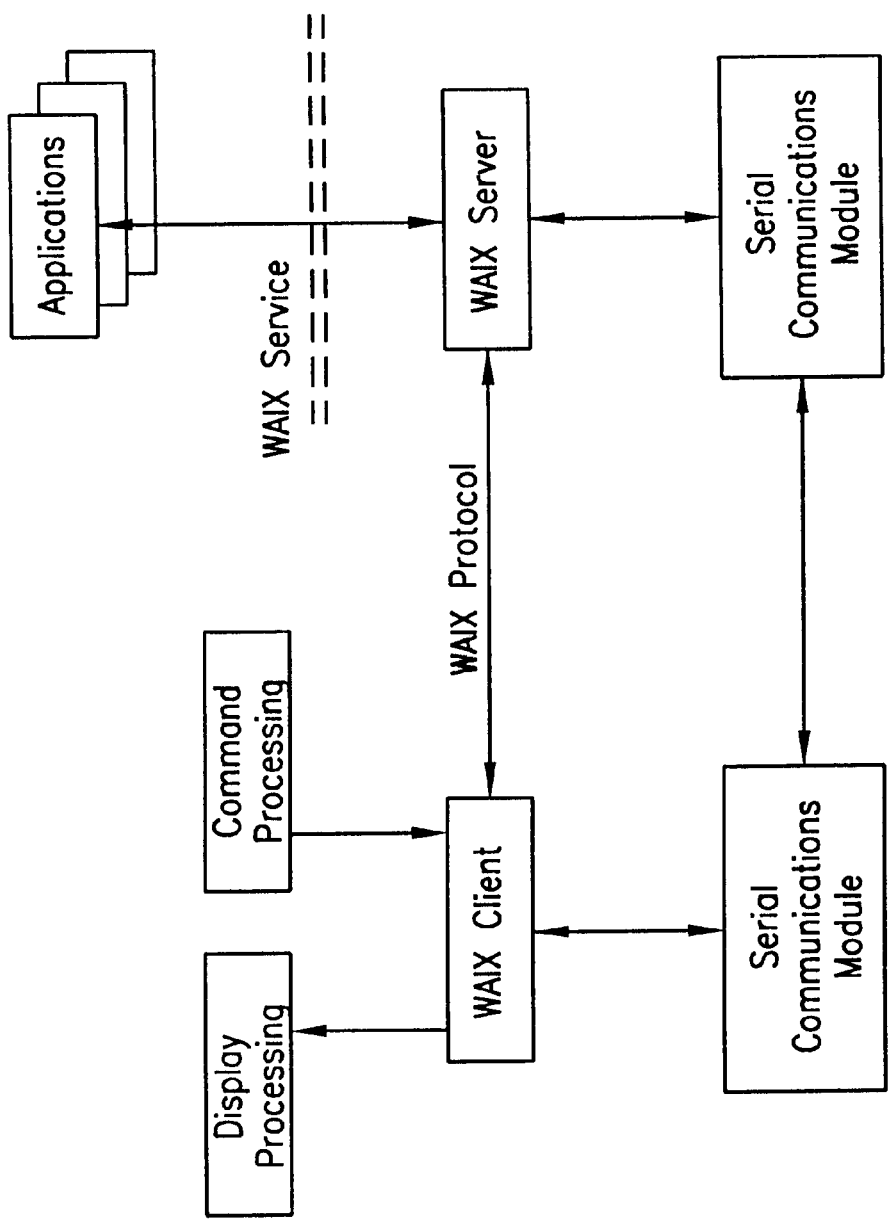
FIG. 8 shows a block diagram of the WAIX protocol used to exchange information between the Internet access server and the network access device.

It is anticipated that when manufactured, the network's access device software will be contained in either EPROM or flash ROM and that the module shown in FIG. 5 will be provided. The real time operating system module may be a conventional commercially available real time operating system which will control the serial ports, the LED, the remote controller and the like. Communication to the Internet access server is accomplished via the COM ports using the software in the network access device. The serial communications module comprises the modules needed for communication such as a link layer, a connection layer and optionally a quality of service (QOS) layer. A WAIX protocol is built on top of the serial communication module The serial communications module may be implemented by conventional off the shelf modules such as TCP/IP running over a PPP or SLIP link. The WAIX protocol is an application protocol on top of TCP/IP, similar to FTP, HTTP or X-windows. The optional additional layer is a quality of service module which may optionally be provided and used. The quality of service module provides an additional reliability layer which alternatively may provide encryption, decryption or compression or decompression features in the protocol layer.

Upon initial start up, the login client software module first is executed when the device is turned on. This client will establish a connection from the network access device to the Internet access server and will transmit information related to the identification of the network access device and other miscellaneous information identifying a given user to the Internet access server. The various World Wide Web service modules and e-mail modules provide a standardized type of interface to the Internet from the network access device. The display processing module provides the services of client applications running on the network access device and allows the display of information on the television. The serial communications modules consist of a link layer protocol module, connection layer protocol, quality of service, and a connection layer interface modules. These modules allow for error-free transmission of data over the telephone lines using modems on both ends of the connection.

A login server module "listens" for any incoming connection from a network access device. When an incoming connection is detected, it receives information identifying the network access device making the connection. The login server module passes this information to the authentication module. The authentication module consults its internal databases where allowable network access device identification information stored. If the identifying information received from the network access device corresponds to an allowable connection, the authentication module allows the connection. The login server sends a positive response to the network access device making the connection. Otherwise the connection is rejected.

On accepting a connection, a login server reports the network access device identifying information, connection time, and other pertinent information to the billing module. The billing module uses this information to keep track of the amount of time the network access device is connected to the Internet Access Server. This information will be used in calculating the charges incurred by the network access device in utilizing the services of the Internet Access Server.

After accepting a connection, the login server module starts an instance of the WAIX server. A WAIX server running in the Internet Access Server and A WAIX client (discussed below) running on the network access device exchange information according to a WAIX protocol. The WAIX protocol is designed for the express purpose of Internet Access Server and the network access device exchanging information for WWW access, Internet E-Mail (IEMail) access, and NetNews access. A separate section explains the details of the WAIX protocol and its elements below.

When a WAIX server is started, it "listens" for any incoming request from a network access device for WWW, IEMail, or NetNews access. When a request is received, it routes the request to the appropriate access modules. Access modules for all three types of Internet access, namely, WWW, IEMail, and NetNews access modules execute on the Internet Access Server.

The function of a WAIX server is to accept inputs from any of the Internet service access modules and convert the output to the WAIX protocol; the WAIX server exports a set of services which can be used by the access modules to communicate information to a WAIX server. The WAIX server then formats the information in appropriate packets for the WAIX protocol and sends the completed packets over the telephone connection to a network access device. The WAIX server uses the services of the serial communications module to send information to the network access device. For an example the WWW access module accesses the WWW on user's requests. It makes a connection to a given Internet address and receives the information from a selected WWW site using, for example the known, HTTP protocol, which is a protocol used by WWW browsers to communicate with WWW servers. A WWW access module then communicates information received to the WAIX server, using the WAIX services, to the network access device.

As another example an IEMail access module accesses the Internet electronic mail service. The Internet electronic mail service is generally implemented using a protocol called Simple Mail Transfer Protocol (SMTP). When a message is received for a registered user of a given Internet Access Server, the SMTP service receives the message and stores it in an E-mail database available in the Internet Access Server. When a request arrives at the IEMail module to access the electronic mail service, the IEMail access module receives the request, accesses the mail database and sends the information to the WAIX server using the WAIX services.

As yet another example a NetNews access module accesses the NetNews service provided by the Internet. NetNews service uses, for example, a protocol known as Net News Transfer Protocol (NNTP) to send and receive newsgroup information from different news servers in the Internet. The NetNews access module is a modified version of any popular news reader program, which uses the standard protocol to access the news groups from the news database. When the user requests to access the newsgroups, the NetNews module reads the newsgroups, and uses the WAIX services to communicate this information to the WAIX server.

The "serial communication module" may be ideally based on a popular modem communication protocol, such as PPP, however need not be.

One of the unique arrangements of this invention is the hardware components contained within the Internet access server. By providing the "smarts" and the connection to the Internet at the "host level", there is an information source for each of the individual access devicees. The standard components of a server computer such as the processor memory disks and the like, are contemplated as part of the Internet access server. A fast Internet connection, such as a T1 or a fractional T1, E1 or ISDN link is contemplated with the modem array being conventional Kbaud modems such as 14.4 or 28.8 modems. By providing the primary "smarts" and storage of the EMail and World Wide Web primary connections at the Internet access server itself rather than on the client device, a lower cost network access device may be provided.

Further, a network access device may be arranged so that it can be used with only one specific Internet access server and accordingly, greater control over the use of the device is accomplished. This provides an increased measure of security from the standpoint of the provider of the service and furthermore, it is contemplated that these devices will be regionalized. An advantage by having this regionalized approach, is that targeted marketing can be accomplished in a more expeditious manner in that an individual Internet access server will serve only a small community as opposed to conventional Internet service providers. Current Internet service providers currently provide service over large areas. It is contemplated that in only small geographic areas will a given Internet access server provide service. As the Internet access server can be implemented on a relatively small computer, such as a "Pentium®" type of device, it is possible to provide many of these in a given community at a relatively low cost from the service provider's perspective. By targeting individual marketing to go along with each transmitted portion of the e-mail or World Wide Web page that is provided to a user, it is possible to provide for targeted marketing which can be accomplished in a easier fashion than would be possible by other mechanisms. For example, using a standard TCP/IP protocol, it is very difficult if not impossible, to determine the exact geographic location of a given individual client on the Internet. However, by using the connection being through Internet Access Server arrangement of this invention, it is possible to determine exactly or very close to exactly, the geographic location of an individual user or client on the system. Accordingly, marketing strategies can be developed based upon the information being accessed by a given user.

The WAIX Protocol

The WAIX protocol discussed above was designed for the exchange of information between the Internet Access Server and network access device. A WAIX server runs in the Internet Access Server which encodes the information according to a WAIX protocol. A WAIX client which runs on each of the network access devices decodes this information and displays the information on the screen. WAIX is designed as a bi-directional protocol, i.e., it carries information in both directions between the Internet Access Server and network access device. The information flow from the Internet Access Server to the network access device consists primarily of information to be displayed on the screen whereas the information flow from the network access device to the Internet Access Server consists primarily of commands entered by the user. The closest known prior art to the WAIX protocol is the known "X" windows protocol.

However, the X windows is designed as a general purpose window management protocol. It is designed as a network-transparent windowing system. With X Windows, multiple applications can run simultaneously in windows, generating text and graphics in monochrome or color on a bitmap display. Network transparency means that application programs can run on machines scattered throughout the network. Because X Windows permits applications to be device-independent, applications need not be rewritten for different display devices.

WAIX is a special purpose window management protocol specifically designed for the Internet applications of this invention such as WWW, Internet Email, and USENET newsgroups. Within the scope of Internet applications of this invention optimizing steps have been performed in the design of the WAIX protocol, such as ease of use, ease of programming, and enhanced performance. The initial design of WAIX assumes a dial-up media (such as telephone lines) and dial-up link layer protocols such as PPP, these simplifying assumptions contribute to several of the optimizing concepts in the design of the WAIX protocol.

X Windows has been designed to run on networked workstations operated by expert computer users. Because the target users of X Windows are expert computer users, X Windows provides several forms of user interface, such as, multiple windows being managed by the user, moving or resizing an application window, multiple fonts, different types of cursors, support for virtual desktops (where the screen size of the desktop is larger than the physical screen size), and support for a variety of input devices such as keyboard, mice, etc. Also, the X Windows protocol provides mechanisms with which all the above user interface policies can be extended by a separate application called the window manager.

WAIX protocol has been designed with ease-of-use as the utmost objective. WAIX will be used not by expert computer users but by laypersons who have never used a computer before. The design of WAIX takes this fact into account in all aspects of window management. For example, though WAIX allows multiple windows to be displayed on the screen, only one can be active at a time and it will be maximized all the time. This eliminats the confusion resulting from multiple windows displayed to the user in different window layouts; this also eliminates the need for moving or resizing windows, thus resulting in a vastly simplified user interface. Another example is that font management is left to the WAIX server, so that depending on the screen size, the WAIX server will form the screen layout. This concept results in better performance on the client, since it does not have to calculate screen layouts for the screen. These are some of the examples of the WIAX protocol's attempt at making the user interface extremely simple.

In the context of the structure and operation of the WAIX protocol, the terms "server" and "client" are used to refer to a WAIX server and a WAIX client respectively. A WAIX server is a server module that runs on the Internet Access Server; a WAIX client runs on or in the network access device. The server and the client use a telephone connection and a serial communications module to exchange information between themselves using the WAIX protocol.

The aforementioned WAIX protocol allows a client to manage the display in multiple windows. A server opens and closes these windows in response to user commands as well as events taking place on the server. Each window consists of multiple display elements and interactive elements. Display elements are those items to be displayed in these windows, such as lines, rectangles, texts, images, etc. Interactive elements are those that require user interaction, such as the user entering some text in response to a question displayed on the screen. The server sends requests to a client to display the elements on the screen. Each request will contain the element to be displayed, an element identifier, the location where it is to be displayed, and any other display attributes, such as bold, italics, color, etc. At any given time, ideally only one of the open windows will be allowed to be active; an active window is where all elements are displayed, and user inputs are accepted, if any. All open windows may not be visible simultaneously to the user; the client may choose to display every open window in a "maximized" view on the screen for the sake of simplicity of user interface. This arrangement will hide all but the active window from the user's view. A client may choose different window management policies depending on the type of display device, if for example an improved type of display is employed with higher resolution than a conventional television screen is used, and the amount of "real estate" (area of display) available on the display device. A WAIX service definition consists of several groups of services:

Local management services

Window management services

Display element services

Interactive element services, and

Event management services

The Local management services include services that allow for configuration and management of resources within a server. Examples include: services that allow applications to register with the server, so that the server may represent the application in the root window, register_application_request, register_application_confirm. The Window management services refer to services that provide for applications to open and close windows. Examples include: open_window_request, open_window_confirm, close_window_request, close_window_confirm, get_aw_request, get_aw_confirm. In the naming of these services the convention of <verb>_<noun>_<request|confirm> was followed. The Display element services let applications specify elements to be displayed on the screen. Elements to be displayed on the screen may for example be text, images, lines, or other types of elements. The commands for example might include: display_text_request, display_image_request. Similar to the display element services, interactive element services allow specific applications such as WWW to specify interactive elements to be displayed on the screen. The Event management services permit an application to handle an asynchronous events reported by a client. Events are asynchronous in nature and they are reported to the server by a client when they happen at a given client. The most common example of this type of an event would be the user entering a command on the remote controller. When these events are reported to the server, the server identifies the owner application of the active window and reports the occurrence of these events. Event management services allow applications to specify their intention to wait for an event, receive an event when one is reported. An example might include: receive_event_request.

Figure 9:
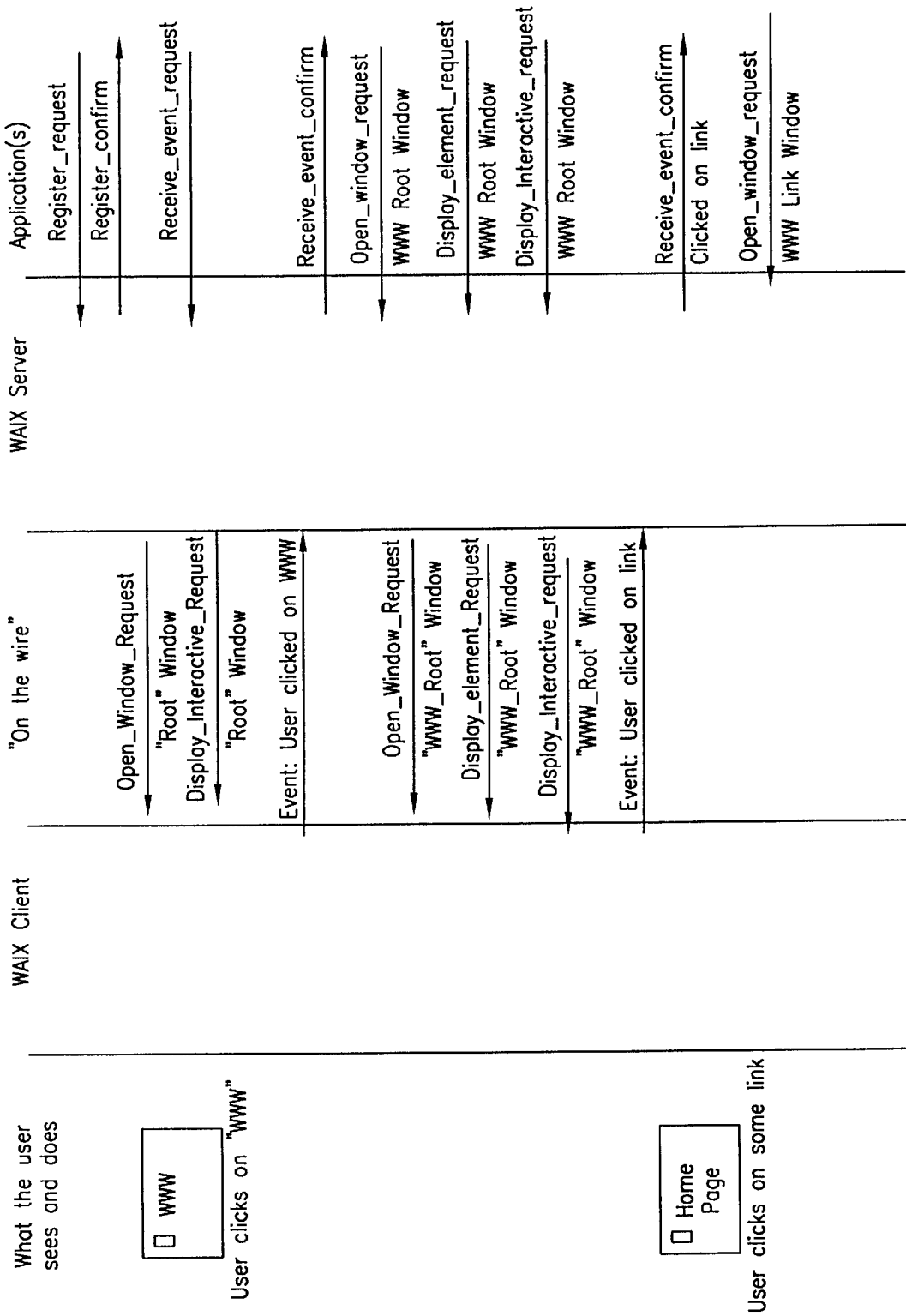
FIG. 9 is a flow diagram of WAIX services and protocols according to this invention.

FIG. 9 shows an example of a WAIX service and protocol sequence that may take place in a typical scenario. The sequence starts with the top right hand corner of the diagram. An application registers itself with a WAIX server. The register request may contain information about the application itself, such as what icon to display on the user screen, name of the application, etc. If there are multiple applications, they will all register with the WAIX server in the same manner. Examples of such applications might be: WWW, IEMail, NetNews applications. The WAIX server acknowledges each register request with a register confirm response. Then the WAIX server sends an open window request to the client. After opening the window, the server sends several display interactive element requests to the client. Each interactive element request corresponds to each application that registered with the server. In the user's screen each application that registered with the server will be represented by an icon that can be clicked by the user. In the meantime, the applications are waiting for a user's action by calling a receive event request, which will block further action until the user takes an action. If multiple applications are registered with the server, the server keeps track where to route an event if the user clicks on one of the interactive elements.

If for example a user selects one of the icons displayed on the screen, such as the WWW application, a client communicates this fact to the server by sending an event to the server. Each element on the screen has a unique id, so the user's action will be associated with the id of the element where the action took place. For example, if the user clicked on WWW application, the resulting event includes the id for the WWW icon on the root window. The server on receiving the event, will determine the owner of the event from its internal events and satisfy its receive event request with a receive event confirm.

On receiving an event, the WWW application proceeds to open a window as its root window. The open window request to the server is communicated to the client. The www application may also display several display and interactive elements corresponding to the current web page being displayed. After all elements are displayed, it will wait for the user action by blocking on a receive event request. The user, on seeing the page being displayed on the screen, will generally proceed by clicking, using the controller on one of the links. This action results in the client sending an event with the id of the interactive element where the user clicked. The WWW application, on receiving an event, opens another window to display the page that was requested by the user. This interaction continues until the user requests to close an open window and goes back to the previous page.

WAIX Protocol Definition

WAIX protocol consists of the following types of messages:
  Requests;
  Responses; and
  Events.
Requests are originated by the server when the server wants to start a certain action on a client, such as opening a new window, or requesting the display of an element on the screen, by the network access device. Some requests from the server may require a response be sent from a client. Examples of such requests are a request to open a window, or getting the identifier of the active window. Opening a window on a client may require allocation of resources such as memory etc., and a given client may be out of such resources. In that case, the client would send a response to the server to indicate that the requested operation was not completed successfully. Events are used by the client to communicate any events that took place in the client. Examples of events are: user actions such as the user pressing the "close" button on the remote controller, lack of some critical resources, etc. Events are usually originated at a client and are transmitted to the server. The event identifies the active window, identifier of the display or interactive element (if applicable), and the event value (which key was pressed or what is the text that was entered by the user, etc.).

WAIX protocol consists of the following request families:

Version Exchange Request: The version exchange request allows the client and the server exchange which revision of the WAIX protocol that they are using.

Exchange of this information will allow for smooth upgrades to future revisions of the WAIX protocol.

1. Window Management Requests: Window management requests allow the server to manage the opening and closing of windows on the client. This family of requests consists of requests to open a window, close a window, get the identifier of an active window, and switch to a different active window. Display Element Requests: The server sends display element requests to the client to display various elements in the current active window. Possible display elements are listed later in this section. Each display element consists of several properties: an element identifier, window in which the display element is part of, location of the element in the display area, and any display attributes. Interactive Element Requests: Interactive elements allow for user interaction with the given elements. Interactive elements have a set of properties similar to those of the display elements: window, element identifier, location, display attributes, and information entered by the user.

WAIX protocol consists of for example the following response families:

Version Exchange Response: The version exchange response identifies the responder's WAIX protocol version number to the sever.

Window Management Responses: This family of responses contain the result of the client's action to the request made by the server.

Display Element Responses: This family of responses indicate the client's response to display element requests.

Interactive Element Responses: Interactive element responses carry the information entered by the user in response to an interactive element displayed on the screen. This usually is the text that the user fills out in a form, the button the user presses in response to a dialog box, etc.

Version Exchange Requests and Responses: Examples of the version exchange requests and responses are shown below.

Version Exchange Request: Server uses this request to notify the client its version of the WAIX protocol and request the client's version of the WAIX protocol.

Window Management Requests and Responses: The following list identifies some of the examples of window management requests and responses.

Create Window Request/Response: The request is used by the server to create a new window on the client side. The response indicates whether a new window was created; if there are any errors creating a new window (such as low memory), the response identifies such a condition to the server.

Close Window Request/Response: The server uses this request to close a window. The response indicates whether the window was closed successfully.

Set Active Window Request/Response: This request sets the window identified as the active window and is displayed on the screen. The client will indicate whether the operation was successful in the response.

Get Active Window Request/Response: The server uses this request to get the identifier of the active window. The response returns the identifier of the current active window being displayed on the screen.

Display Element Requests and Responses: The following display element requests and responses are part of the WAIX protocol.

Display Text: Display Text element allows the server to send a string of characters to be displayed on the screen. The server may specify several properties for the text to be displayed: starting position on the screen, color, font, size, attributes (bold, italics, blinking, underlined), etc. The WAIX client uses these attributes as its guidelines to display the text on the screen Display Background: Display background element sets the background for the window being displayed.

Display Image: The server uses the display image element to send a predefined image to be displayed by the client. Along with the display image command, the WAIX server specifies several properties of the image: format of the image (bitmap or compressed), location on the screen, alternative text to be displayed if WAIX client cannot interpret the format, etc.

Display Line: The server uses the display line element to direct the client to display a line on the screen. Properties of the line may include starting position, ending position, thickness of the line, color of the line and any other attributes.

Display Rectangle: The display rectangle element is used by the server to direct the client to display a rectangle on the screen. The server may specify the properties of the rectangle, such as length, width, starting position in the screen, fill color, etc.

Interactive Element Requests and Responses: The following interactive elements are part of the WAIX protocol:

Interactive Text: Interactive text element allows the server to specify an area of screen where the user will enter some text. When the user completes entering the text, it will be sent to the server in the form of an event message.

Interactive Lists: Interactive lists are those where the server specifies a list of items to be displayed and the user selects one or more items from this list. Whether or not the user is allowed to select more than one item from the list is a property of an interactive list. When the user selects item(s) from the list, the server will be notified by an event.

Interactive Question: Interactive question allows the server to ask a question which will have two possible answers: affirmative and negative. The user will respond by pressing appropriate keys in the remote controller and the response will by notified to the server by an event.

Interactive Buttons: Interactive buttons allow a list of buttons to be displayed on the screen and the user will select one or more buttons. Types of buttons (radio, rectangular with text, etc.) may be specified as part of the request. as well as whether one or multiple selections are allowed.

WAIX Protocol Events

WAIX protocol consists of the following families of events:

Key Press Events: Key press events notify the server when a key is presses by the user on the remote controller. This includes all the keys on the remote controller except the cursor movement keys. The cursor movement keys are covered by a separate family of events. Pressing other keys such as open, back, help, etc. will result in an event generated to the server.

Text Enter Events: When the user enters some text in an are of the screen, it will be notified to the server using an event belonging to this family. The actual text entered by the user will be sent to the server as part of the event.

Cursor Motion Events: Cursor motion events notify the server when the user uses the cursor movement keys on the remote controller. These events are generated on a periodic interval while the cursor is in motion; the purpose of these events is for the server to change the shape of the cursor depending on where it is positioned.

Window Expose Events: This family of events is used by the client when a window (or part of a window) is exposed and the client did not have the window's contents cached in client's memory. This event will usually result if the user presses the back key on the remote controller and the client did not cache the previous window's contents.

Error Events: The client uses this family of events to notify the server when an error has occurred on the client's side.

Additional functionality of the the system described herein is also contemplated. For, example it is possible to use the network access device and the internet access server as a "game rental device" by providing a download function from the internet access server to the network access device. The internet access server can keep track both for accounting purposes the games "rented" by downloading but also can keep track of the games for the purposes of target marketing of new or improved games by providing a suggestion of new or updated games for the user to play.

A further use by providing a microphone attachment to the network access device can provide a two-way voice capability to other users so that the system can operate as a telephone over the internet.

Although a preferred embodiment of the present invention has been illustrated in the accompanying drawings and described in the foregoing detailed description, it will be readily understood that the invention is not limited to the embodiment disclosed, but is capable of numerous rearrangements, modifications or substitutions without departing from the spirit of the invention as set forth and defined by the following appended claims.

What is claimed is:

1. A system for accessing the Internet, said system comprising:

an Internet access server having a memory;

a network access box having a memory and telephonically connected to the Internet access server; and a television having a display electrically connected to the network access box, wherein the Internet access server communicates directly with the Internet, the network access box controls the display, and the network access box communicates with the Internet access server using a WAIX protocol.

2. The system of claim 1, wherein the WAIX protocol is divided into a WAIX server module and a WAIX client module, and wherein the server module is contained in the Internet access server memory, and the client module is contained in the network access box memory.

3. The system of claim 2, wherein communications from the Internet access server to the network access box include requests, which comprise display element requests.

4. The system of claim 2, wherein communications from the Internet access server to the network access box include requests consisting of request messages selected from the group of version exchange requests, window management requests, display element requests, or interactive element requests.

5. The system of claim 3, wherein communications to the Internet access server from the network access box include responses, which comprise display element responses.

6. The system of claim 4, wherein communications to the Internet access server from the network access box include responses consisting of response messages selected from the group of version exchange responses, window management responses, display element responses, or interactive element responses.

7. The system of claim 2, wherein communications from the Internet access server to the network access box include requests, which comprise interactive element requests.

8. The system of claim 7, wherein communications from the Internet access server to the network access box include responses, which comprise interactive element responses.

9. The system of claim 2, wherein communications to the Internet access server from the network access box include events consisting of event messages selected from the group of key press, text enter, cursor motion, window expose, or error events.

10. A network access box telephonically connected to an Internet access server, said box comprising:
   a central processing unit;
   a memory in electronic communication with the central processing unit, the memory containing a WAIX client protocol software module;
   a video adaptor in electronic communication with the central processing unit; and
   a remote control processor in electronic communication with the central processing unit.

11. The system of claim 10, wherein communications from the Internet access server to the network access box include requests, which comprise display element requests.

12. The system of claim 11, wherein communications to the Internet access server from the network access box include responses, which comprise display element responses.

13. The system of claim 10, wherein communications from the Internet access server to the network access box include requests, which comprise interactive element requests.

14. The system of claim 13, wherein communications from the Internet access server to the network access box include responses, which comprise interactive element responses.

15. A method of operating an Internet access system having a network access box WAIX client in telephonic communication with an Internet access WAIX server, comprising the steps of:
   sending a register request message from the box to the server;
   sending a register confirm message from the server to the box;
   sending a display interactive element request message from the server to the box;
   waiting for a user response event message to be sent from the box to the server; and
   receiving an event confirm message from the server at the box.

16. The method of claim 15, comprising the additional step of:
   sending a display element request message from the server to the box.

17. The method of claim 15, comprising the additional steps of:
   sending an open window request message from the server to the box; and
   opening a display window.

18. The method of claim 15, wherein the steps of:
   sending a display interactive element request message from the server to the box;
   waiting for a user response event message to be sent from the box to the server; and
   receiving an event confirm message from the server at the box are repeated.

* * * * *